United States Patent [19]
Campbell
[11] 3,737,675
[45] June 5, 1973

[54] LATCHED GATING CIRCUIT

[75] Inventor: Robert Bruce Campbell, Los Angeles, Calif.
[73] Assignee: Lear Siegler Inc., Santa Monica, Calif.

[22] Filed: Dec. 15, 1971
[21] Appl. No.: 208,346
[52] U.S. Cl. ....307/211, 307/235 R, 307/289, 328/150, 328/175
[51] Int. Cl. ...H03k 17/30, H03k 3/295, H03k 19/42
[58] Field of Search ....307/201, 213, 204, 307/211, 214, 215, 218, 289, 290, 291, 292, 273; 328/60, 61, 92, 94, 158, 159, 173, 175, 192, 196, 200, 206

[56] References Cited

UNITED STATES PATENTS

| | | | |
|---|---|---|---|
| 3,275,849 | 9/1966 | Coates, Jr. et al. | 307/291 |
| 3,250,921 | 5/1966 | Brette | 307/292 X |
| 3,234,401 | 2/1966 | Dinman | 307/211 X |
| 3,155,839 | 11/1964 | Modiano | 307/201 |
| 3,104,327 | 9/1963 | Rowe | 307/238 X |
| 3,249,762 | 5/1966 | Kintner | 307/289 X |
| 3,113,206 | 12/1963 | Harel | 307/211 X |
| 3,165,644 | 1/1965 | Clapper | 307/201 |
| 3,293,609 | 12/1966 | Martin | 307/201 X |
| 3,522,445 | 8/1970 | Foerster | 307/211 |

*Primary Examiner*—John W. Huckert
*Assistant Examiner*—L. N. Anagnos
*Attorney*—Harold L. Jackson, Stanley R. Jones, Robert M. Vargo and Eric T. S. Chung

[57] ABSTRACT

A latched gating circuit that is characterized by remaining in an "enabled" state until removal of all inputs initially required to switch the circuit to the "enabled" state, is disclosed. The circuit includes a gating transistor which is rendered conductive in response to the application of input signals to preselected ones of the input terminals of the gating circuit. A latching transistor is connected in a feedback arrangement between the gating transistor and the input terminals to maintain the gating transistor conductive until all of the input signals are removed.

11 Claims, 2 Drawing Figures

LATCHED GATING CIRCUIT

BACKGROUND OF THE INVENTION

1. Field of the Invention

This invention generally relates to an improved gating circuit. More specifically, the present invention concerns a latched gating circuit that is maintained in the state to which it is switched, i.e., "enabled" state, until all input signals are removed from the input terminals thereof.

2. Description of the Prior Art

Control systems of the type used, for example, in aircraft include a variety of gating circuits. As may be readily recognized, these gating circuits may perform a multitude of different functions besides simply "gating" per se, i.e., detecting, adding, filtering, etc. For the most part, gating circuits having any selected function may be fabricated by using combinations of readily available logic circuits, i.e., AND gates, OR gates, NAND gates, etc.

In many instances a considerable number of logic circuits must be combined to accommodate a desired functional criterion. In cases where size, cost, complexity, physical weight, etc. are of secondary importance, or of no importance, the use of such conventional logic circuitry is likely to be highly acceptable. However, where such considerations are important, as in aircraft control systems, conventional logic circuitry oftentimes provides a cumbersome solution at best. A latched gating circuit is a case in point. For example, a latched gating circuit may be constructed by using a number of AND gates in conjunction with a flip-flop wherein the SET input terminal of the flip-flop is connected to receive the outputs of any number of AND gates intended to recognize predetermined combinations of input signals and the RESET input terminal of the flip-flop is connected to a further AND gate that serves to recognize the absence of the input signals.

It is accordingly the intention of the present invention to provide a latched gating circuit having a nominal number of elements and which permits a considerable savings in cost, size, weight, etc., over fabrication of the same circuit with conventional logic circuitry.

SUMMARY OF THE INVENTION

Briefly described, the present invention involves a gating circuit that is maintained, or latched, in an enabled state until removal of all of the input signals that were initially capable of switching the gating circuit to the enabled state.

More particularly, the subject gating circuit includes a first transistor connected to be rendered conductive in response to the application of a predetermined combination of input signals. The necessary combinations of input signals are determined by weighting elements connected in a plurality of input terminals. A second transistor is connected between the input terminals and the first transistor to maintain the first transistor conductive until all input signals are removed from the input terminals.

The objects and many attendant advantages of the invention will be more readily appreciated as the same becomes better understood by reference to the following detailed description which is to be considered in conjunction with the accompanying drawings wherein like reference symbols designate like parts throughout the figures thereof.

DESCRIPTION OF THE PREFERRED EMBODIMENT

Figure 1:
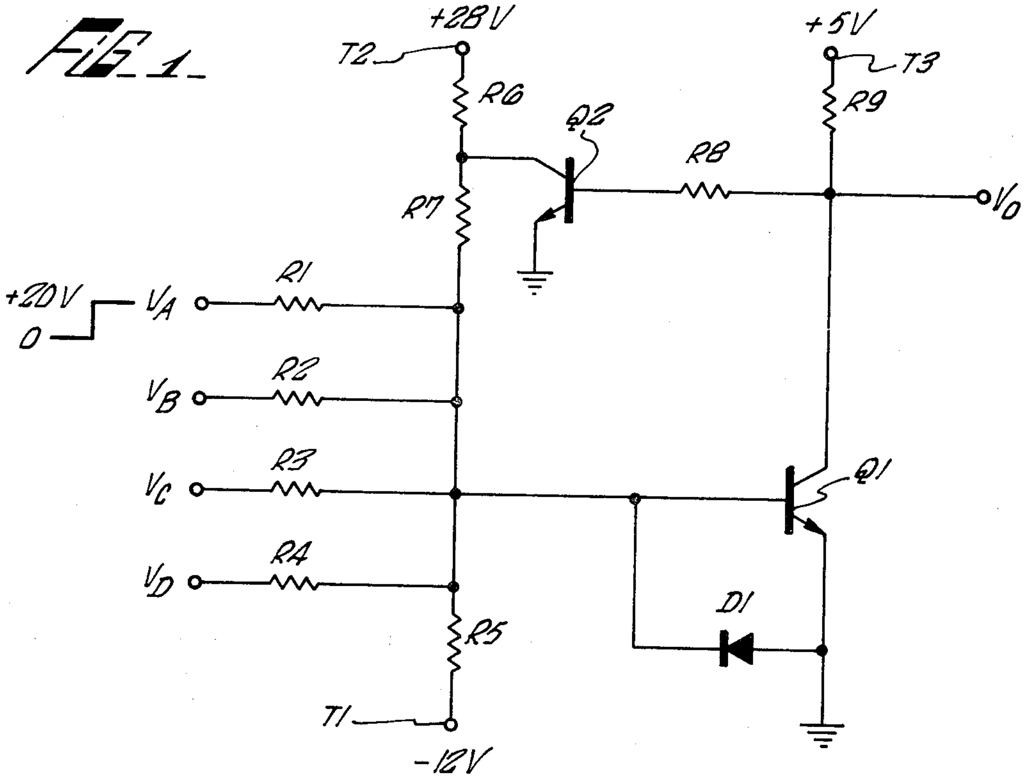
FIG. 1 is a schematic diagram illustrating an embodiment of the present invention.

Referring now to FIG. 1, a latched gating circuit, in accordance with the present invention includes a gating transistor Q1 and a latching transistor Q2 connected in a feedback arrangement. The gating transistor Q1 is connected to be base-biased into conduction in response to selected combinations of the input terminals $V_A$, $V_B$, $V_C$ and $V_D$ receiving input signals.

The combinations of input terminals to which input signals must be applied to render the transistor Q1 conductive is essentially determined by a set of weighting resistors and a current source. The set of weighting resistors R1, R2, R3 and R4 are respectively connected in series between a corresponding set of input terminals $V_A$, $V_B$, $V_C$ and $V_D$ and the base electrode or element of the transistor Q1. The relative values of these resistors R1, R2, R3 and R4 determine the importance of the respective input terminals connected thereto. The current source may simply involve a resistor R5 connected in series with a biasing terminal T1 to which an appropriate DC voltage source is connected.

Once conductive, the transistor Q1 is maintained conductive, i.e., latched, until all input signals have been removed. This latching is produced by the transistor Q2 which operates in conjunction with a latching current source provided by a pair of resistors R6 and R7 which are connected in series with a biasing terminal T2 to which another DC voltage source is connected.

As shown, an output terminal $V_O$ is connected to the junction of the collector electrode of the transistor Q1, a resistor R8 in series with the base electrode of the transistor Q2, and a load resistor R9 in series with a biasing terminal T3. A further DC voltage source is connected to the terminal T3.

The transistors Q1 and Q2 are connected to have either one or the other conductive. Thus, when the circuit is in an initialized state, i.e., no inputs applied to the input terminals $V_A$, $V_B$, $V_C$ and $V_D$, the transistor Q1 is non-conductive and the transistor W2 is conductive. When the transistor Q1 is conductive, then the transistor Q2 accordingly becomes non-conductive.

Considering the operation of the subject gating circuit in detail, assume that the various circuit elements have values as follows:

| | |
|---|---|
| Resistors R1, R2 | 20 kilohms |
| Resistors R3, R4 | 40 kilohms |
| Resistor R5 | 9.6 kilohms |
| Resistors R6, R7 | 14 kilohms |
| Resistor R8 | 51 kilohms |
| Resistor R9 | 4.7 kilohms |
| Transistors Q1, Q2 | Type 2N2222A |
| DC Voltage Source at Terminal T1 | −12 volts |
| DC Voltage Source at Terminal T2 | +28 volts |
| DC Voltage Source at Terminal T3 | +5 volts |
| Input Signals at $V_A$, $V_B$, $V_C$, $V_D$ | +20 volts |

With no input signals applied to the input terminals $V_A$, $V_B$, $V_C$ and $V_D$, the base electrode of the transistor Q1 is essentially maintained at ground potential by having a diode D1 connected to a grounded emitter electrode of the transistor Q1. The diode D1 also serves to protect the base-emitter junction from damage due to excessive reverse voltages, i.e., in this case an excessive negative voltage applied to the base electrode of the transistor Q1. With its base and emitter electrodes both maintained at ground potential, the transistor Q1 is non-conductive. The transistor Q2 on the other hand, is properly biased into conduction by the voltage sources of the terminals T2 and T3 and by the emitter electrode of the transistor Q2 being connected to ground. With the resistor R8 being considerably larger than the resistor R9, the output terminal $V_O$ is maintained at just less than +5 volts.

The base terminals of the transistor Q1 is connected to the junction of the resistors R1, R2, R3, R4, R5 and R7. This junction is effectively a summing junction of all currents flowing through the resistors. With a "negative" voltage source connected to the terminal T1, the "negative" current flow through the resistor R5 must be overcome to have the base electrode of transistor Q1 biased positive with respect to the collector electrode. Since the positive voltage source connected to the terminal T2 is grounded through the transistor Q2, when conductive, no current flows through the resistor R7 when the gating circuit is "initialized." The compensating positive currents must thus be provided from the input terminals $V_A$, $V_B$, $V_C$ and $V_D$. Using the above-indicated values, the "negative" current through the resistor R5 is in the neighborhood of −1.25 ma. The "positive" current through the resistors R1 and R2, with input signals (+20 volts) applied, would be +1.0 ma. while the current through the resistors R3 and R4 would be +0.5 ma. Clearly, the application of input signals to any one of the input terminals $V_A$, $V_B$, $V_C$, and $V_D$, would be insufficient to render the transistor Q1 conductive. On the other hand, application of input signals to two or more terminals including the terminals $V_A$ and/or $V_B$ would be sufficient.

Once the transistor Q1 is conductive, the output terminal $V_O$ will be maintained at ground potential and, as earlier mentioned, the transistor Q2 becomes non-conductive. The voltage source connected to the terminal T2 no longer being grounded, a current flow of +1.0 ma. is provided through the resistor R7. This current through the resistor R7 in combination with current flow through any of the input weighting resistors R1, R2, R3 and R4 is sufficient to maintain the transistor Q1 in a conductive state. Thus, the gating circuit will remain in an enabled state and the output terminal $V_O$ will remain at ground potential until all input signals are removed, whereupon the transistor Q1 becomes non-conductive, the transistor Q2 becomes conductive, and the output terminal $V_O$ reverts to +5 volts.

Operation of the exemplary latched gating circuit of FIG. 1 is summarized in tabular form by the following "truth" table which lists the five minimum combinations of inputs required to switch the gating circuit to the enabled state. All other input combinations including the combinations shown, i.e., $V_a + V_b + V_C$, etc., will of course switch the gating circuit to the "enabled" state. Conversely, all other combinations not including those combinations shown in the truth table, i.e., $V_C$ and $V_D$, will fail to switch the gating circuit. As earlier mentioned, all input signals must be removed to permit the gating circuit to revert to the initialized state where the output terminal reverts to a +5 volts output level.

Inputs Output

| $V_A$ | $V_B$ | $V_C$ | $V_D$ | $V_O$ |
|---|---|---|---|---|
| 20 | 20 | 0 | 0 | 0 |
| 20 | 0 | 20 | 0 | 0 |
| 20 | 0 | 0 | 20 | 0 |
| 0 | 20 | 20 | 0 | 0 |
| 0 | 20 | 0 | 20 | 0 |

Figure 2:
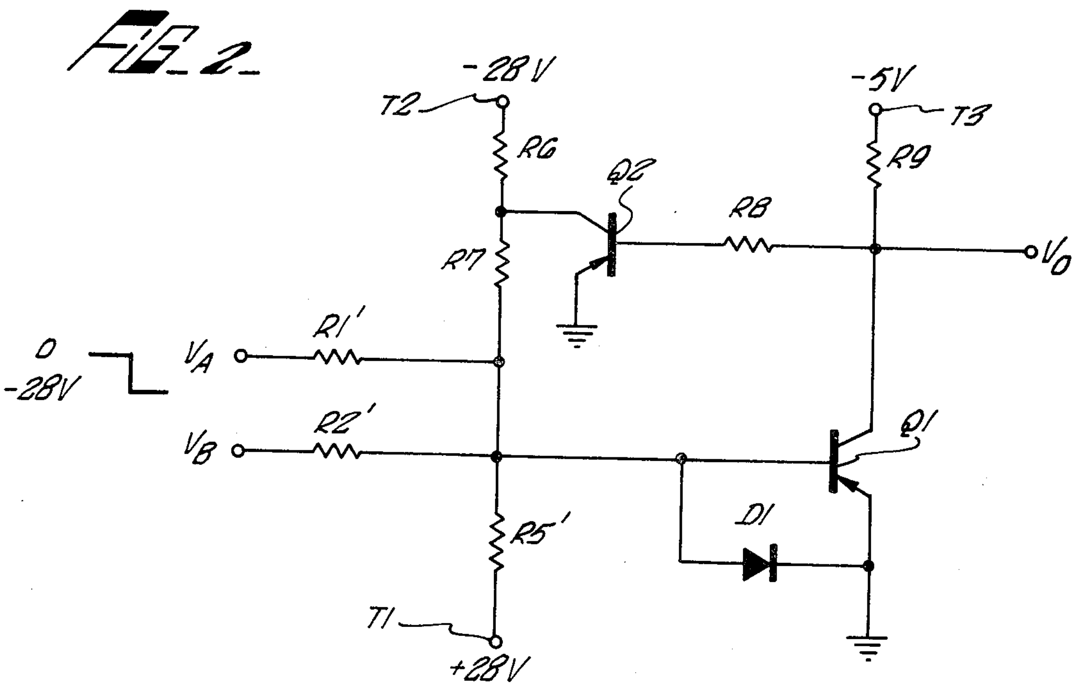
FIG. 2 is a schematic circuit diagram illustrating the present invention configured to provide a latched NAND gate.

It is to be understood that the specific elemental values above-enumerated, are exemplary and that any other suitable elemental values may be used to, for example, establish different input signal preferances, priorities and/or degrees of importance. In the alternative, the values of the weighting resistors may also be adjusted to remove any preferances and to require that all input signals be present to have the gating circuit switched to the enabled state. Further, PNP type transistors may be used in place of NPN type transistors as is well known in the art. Such alternatives are illustrated by FIG. 2 in which only two inputs $V_A$ and $V_B$ are employed. The weighting resistors R1′ and R2′ would have equal values wherein the current flow through either of the resistors R1′ or R2′ is insufficient to overcome the opposing current flow from the terminal T1 to render the transistor Q1 conductive. For example, the elemental values of FIG. 1 may be changed as follows:

| | |
|---|---|
| Resistors R1′ and R2′ | 27 kilohms |
| Resistor R5′ | 20 kilohms |
| DC Voltage at Terminal T 1 | +28 volts |
| DC Voltage at Terminal T2 | −28 volts |
| DC Voltage at Terminal T3 | −5 volts |
| Input Signals at $V_A$ and $V_B$ | −28 volts |

The polarity of the voltages applied to the terminals T1, T2 and T3 and to the inputs $V_A$ and $V_B$ are reversed to accommodate the illustrated use of PNP type transistors for Q1 and Q2. The approximately −1.0 ma. currents through each of the resistors R1′ and R2′ would be singly insufficient to overcome the +1.4 ma. current from the terminal T1. Accordingly, the application of input signals to both of the input terminals $V_A$ and $V_B$ would be required to switch the gating circuit to the enabled state. Once so switched, the −1.0 ma. current from the terminal T2, in combination with current flow from either or both of the input terminals $V_A$ and $V_B$, would be sufficient to maintain the gating circuit in the enabled state.

The following truth table summarizes the operation of the circuit of FIG. 2:

| Inputs $V_A$ | $V_B$ | Output $V_O$ |
|---|---|---|
| 0 | 0 | −5 initial state |
| 0 | −28 | −5 |
| −28 | 0 | −5 |
| −28 | −28 | 0 enabled state |
| 0 | −28 | 0 latched |
| −28 | 0 | 0 latched |
| 0 | 0 | −5 return to initial state |

It is clear that the gating circuit of FIG. 2 may be functionally considered as a NAND gate that is latched to the enabled state until all of the inputs are removed. However, the preference of output signal voltage levels may be readily inverted to have the circuit of FIG. 2 perform the function of an AND gate that is latched. Similarly, although 0 volts has been used in the foregoing description to define a condition in which no input signals are applied to the input terminals, the exemplary +28 volts or −28 volts may serve equally well as the ambient "no" input signal condition. The "initialized" and "enabled" state designation could then also be reversed.

It is to be understood that any number of input terminals having appropriately assigned weighting factors may be used.

From the foregoing it is apparent that the present invention provides a gating circuit that in effect is programmed to be switched to an enabled state in response to predetermined combinations of input signals, and is latched to the enabled state until all of the input signals are removed.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the present invention may be made.

What is claimed is:

1. A gating circuit for providing an output signal having either first or second signal levels at an output terminal, said gating circuit comprising:
- a plurality of input terminals adapted to receive input signals;
- switching means for controlling the signal level of said output signal, said switching means having initialized and enabled states corresponding to said first and second signal levels, respectively, said enabled state being assumed whenever input signals are applied to selected input terminals;
- weighting means for defining the selected input terminals to which input signals must be applied to have said switching means assume said enabled state; and
- latching means exclusively responsive to output signals at said second signal level for providing a latching signal to said switching means to maintain said switching means in said enabled state until all input signals are removed from said input terminals, whereupon said switching means automatically reverts to said initialized state thereof.

2. The gating circuit defined by claim 1, said switching means including a first bistable device adapted to be rendered conductive in response to predetermined bias signals being applied thereto, said input terminals being connected to said switching means to provide said predetermined bias signals when input signals are applied to said selected input terminals.

3. The gating circuit defined by claim 2 wherein said selected input terminals exclusively include all input terminals.

4. The gating circuit defined by claim 2, said weighting means including a plurality of resistance elements respectively connected between said input terminals and said switching means, said resistance elements being sized to define said selected input terminals to which input signals must be applied to provide said predetermined bias signals to said switching means.

5. The gating circuit defined by claim 4, said latching means including:
- a second bistable device connected to be rendered non-conductive by said first bistable device becoming conductive; and
- a source of latching signals which are applied to said first bistable device when said second bistable device is non-conductive, said latching signals in combination with an input signal at any input terminal providing said predetermined bias signals to said switching means to maintain said first bistable device conductive.

6. The gating circuit defined by claim 5 wherein said first and second bistable devices are transistors, said resistance elements are resistors connected between said input terminals and a single electrode of said first bistable device.

7. The gating circuit defined by claim 6, wherein said switching means only assumes the enabled state in response to input signals being applied to all of said input terminals.

8. A gating circuit characterized by an enabled state and a non-enabled state, said gating circuit comprising:
- a plurality of input terminals;
- an output terminal;
- bistable means for switching to an enabled state in response to the application of input signals at selected combinations of input terminals; and
- latching means, exclusively responsive to said bistable means being in said enabled state, for maintaining said bistable means in said enabled state until input signals are removed from all of the input terminals whereupon said bistable means automatically reassumes a non-enabled state.

9. The gating circuit defined by claim 8 further including means for defining said selected combinations of input terminals to which input signals must be applied to have said bistable means switched to an enabled state.

10. A gating circuit including:
- a plurality of input terminals;
- a first transistor connection to said input terminals to be rendered conductive only in response to input signals being applied to certain input terminals;
- a second transistor connected to be rendered non-conductive by said first transistor becoming conductive; and
- means for applying latching signals to said first transistor only in response to said second transistor being rendered non-conductive, said latching signals maintaining said first transistor conductive until input signals are no longer applied to said input terminals whereupon said first transistor automatically becomes non-conductive.

11. The gating circuit defined by claim 10 further including a plurality of resistors connected to said input terminals and to said first transistor to determine said certain input terminals to which input signals must be applied to render said first transistor conductive.

* * * * *